Patented Oct. 22, 1935

2,018,234

UNITED STATES PATENT OFFICE 2,018,234

AZO DYE AND METHOD FOR ITS PREPARATION

Francis Hervey Smith, Woodstown, N. J., and Crayton Knox Black, Wilmington, Del., assignors to E. I. du Pont de Nemours & Company, Wilmington, Del., a corporation of Delaware No Drawing. Application July 26, 1932, Serial No. 624,900

12 Claims. (Cl. 260—72)

This invention relates to azo dyes, and more particularly refers to azo dyes especially suitable for dyeing leather.

In the past when leather was dyed it was frequently necessary to use a mixture of dyes, as a result of which the resulting color was uneven and often had very poor stability. This was particularly true where it was desired to dye leather various shades of brown.

It is an object of this invention to produce dyes which are especially adapted for dyeing leather in even shades, particularly the various shades of brown. It is a further object to produce dyes which may be used to dye wool and other material. Additional objects will appear hereinafter.

These objects are accomplished by the present invention wherein a dye of the following general formula is produced:

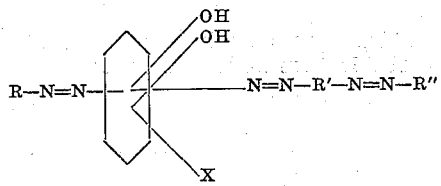

In this formula R, R', and R'' represent aryl groups, and X represents groups such as halogen, alkyl, alkoxy, nitro, carboxyl, sulfonic, hydroxyl, and hydrogen. This compound may be produced by coupling a diazotized aromatic amine with a dihydroxy benzene, coupling this compound with a diazotized aromatic nitro-amine or mono-acyl-diamine, treating the resulting compound to convert the nitro or mono-acyl-amino group to an amino group, then diazotizing and coupling with an aromatic coupling component.

The invention will be more fully understood by reference to the following examples, in which the quantities are stated in parts by weight:

Example I 17.3 parts of sulfanilic acid were stirred in 250 parts of water. 4 parts of sodium hydroxide were added which dissolved the sulfanilic acid. The solution was iced to approximately 5° C. and made acid with 9 parts 100% hydrochloric acid. It was then diazotized by the addition of 6.9 parts of sodium nitride. To this diazo was added a solution of 11 parts of resorcin in 100 parts of water. After the addition of the resorcin, approximately 25 parts of sodium acetate were added. Coupling was completed within 30 minutes. 12 parts of sodium hydroxide were added, which dissolved the dye.

19.9 parts of picramic acid were stirred in 400 parts of water and 4 parts of sodium hydroxide added. The solution was then acidified with 9 parts of 100% hydrochloric acid and diazotized at 15-20° C. with 6.9 parts of sodium nitrite. This diazo was added to the above alkaline solution. After stirring one hour, hydrochloric acid was added until the combination was slightly acid and then freshly slaked lime was added, until alkaline to brilliant yellow papers. The dye was heated to 95° C. and a solution of 15.9 parts of $Ca(SH)_2$ added. Reduction was completed in 2 hours after which the dye was salted 20% by volume and filtered. The press cake was reslurried in 400 parts of water, made acid with approximately 9 parts of 100% hydrochloric acid and diazotized at 20° C. with 6.9 parts of sodium nitrite for one hour. A solution of 20 parts of meta phenylene diamine sulfonic acid in 200 parts of water was added, and then sodium acetate until the mixture was no longer acid to Congo red paper. The dye was stirred one hour and then filtered cold without the addition of salt.

The dry dye was a black powder which dissolved in water to give a dark brown solution and in concentrated sulfuric acid to give a reddish-brown solution.

It dyed leather a dark chocolate-brown.

Its probable formula is as follows:

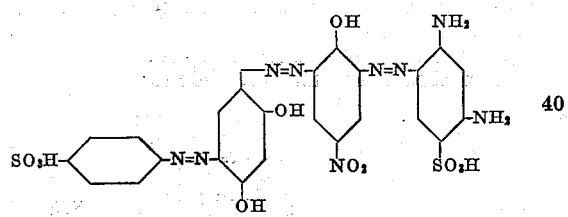

On reducing with sodium hydrosulfite the following compounds are obtained:

Sulfanilic acid, 2,4-diamino-resorcin, 2,4,6-triamino-phenol, 2,4,5-triamino-benzene-sulfonic acid.

Example 2

12 parts of meta-phenylene-diamine were substituted for the 20 parts of meta phenylene diamine sulfonic acid in Example 1.

The dry dye was a black powder which dissolved in water to give a yellowish-brown solution and in concentrated sulfuric acid to give a reddish-brown solution.

It dyed leather a yellow-brown.
Its probable formula is as follows:

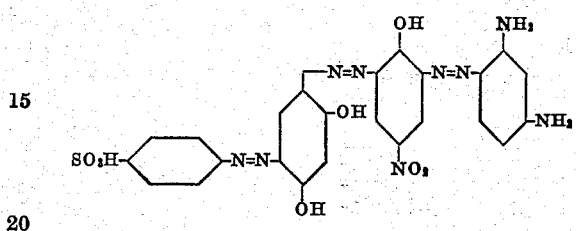

On reducing with sodium hydrosulfite the following compounds are obtained:
Sulfanilic acid, 2,4-diamino-resorcin, 2,4,6-triamino-phenol, 2,3,5-triamino-benzene.

Example 3

22.3 parts of a technical mixture of 1-aminonaphthalene-6(and 7)-sulfonic acid were substituted for the 17.3 parts of sulfanilic acid in Example 1.

The dry dye was a black powder which dissolved in water to give a dark brown solution and in concentrated sulfuric acid to give a violet solution.

It dyed leather a yellow-brown.
Its probable formula is as follows:

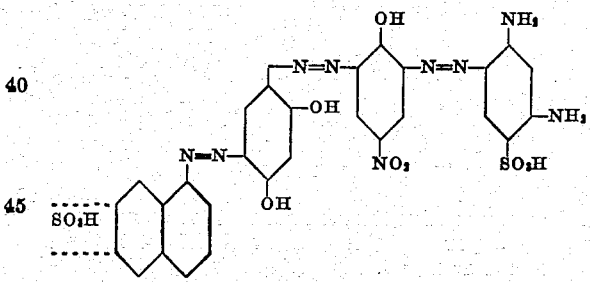

On reducing with sodium hydrosulfite the following compounds are obtained:
Mixed Cleve's acid, 2,4-diamino-resorcin, 2,4,6-triamino-phenol, 2,4,5-triamino-benzene-sulfonic acid.

Example 4

15.4 parts of p-nitro-o-amino-phenol were substituted for the 19.9 parts of picramic acid in Example 1.

The dry dye was a dark brown powder which dissolved in water to give a yellow-brown solution and in concentrated sulfuric acid to give a dark brown solution.

It dyed leather a reddish-brown.
Its probable formula is as follows:

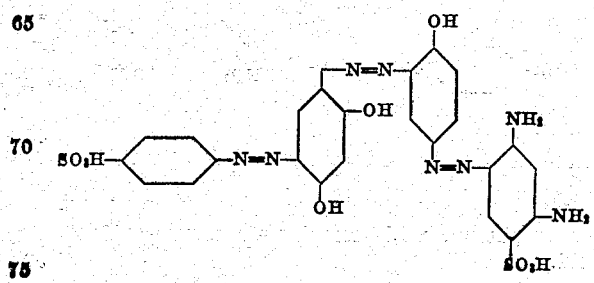

On reducing with sodium hydrosulfite the following products are obtained:
Sulfanilic acid, 2,4-diamino-resorcin, 2,4-diamino-phenol, 2,4,5-triamino-benzene-sulfonic acid.

Example 5

22.3 parts of naphthionic acid were substituted for the 17.3 parts of sulfanilic acid in Example 1.

The dry dye was a black powder which dissolved in water to give a dark brown solution and in concentrated sulfuric acid to give a violet solution.

It dyed leather a dark chocolate-brown.
Its probable formula is as follows:

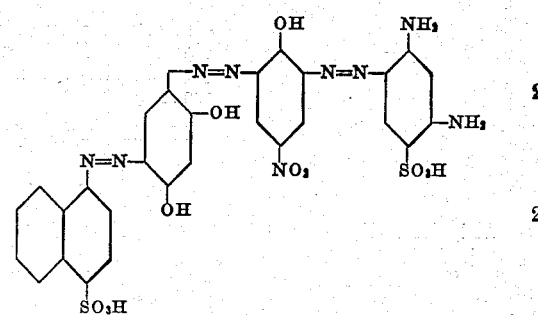

On reducing with sodium hydrosulfite the following compounds are obtained:
Naphthionic acid, 2,4-diamino-resorcin, 2,4,6-triamino-phenol, 2,4,5-triamino-benzene-sulfonic acid.

Example 6

22 parts of meta-toluylene-diamine-sulfonic acid were substituted for the 20 parts of meta-phenylene-diamine-sulfonic acid in Example 5.

The dry dye was a black powder which dissolved in water to give a red-brown solution and in concentrated sulfuric acid to give a red-brown solution.

It dyed leather a dark chocolate brown.
Its probable formula is as follows:

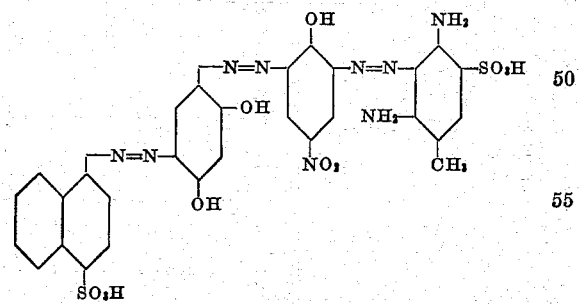

On reducing with sodium hydrosulfite the following compounds are obtained:
Naphthionic acid, 2,4-diamino-resorcin, 2,4,6-triamino - phenol, 2,3,4-triamino-toluene-5-sulfonic acid.

Example 7

22.1 parts of 2-chlor-5-toluidine-4-sulfonic acid were substituted for the 17.3 parts of sulfanilic acid in Example 1.

The dry dye was a black powder which dissolved in water to give a yellow-brown solution and in concentrated sulfuric acid to give a red-brown solution.

It dyed leather a yellow brown.

Its probable formula is as follows:

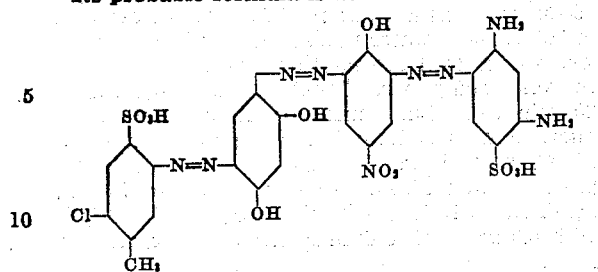

On reducing with sodium hydrosulfite the following compounds are obtained:

2-chlor-5-toluidine-4-sulfonic acid, 2,4 - diamino-resorcin, 2,4,6-triamino-phenol, 2,4,5-triamino-benzene-sulfonic acid.

Example 8

18.7 parts of p-toluidine-m-sulfonic acid were substituted for the 17.3 parts of sulfanilic acid in Example 1.

The dry dye was a black powder which dissolved in water to give a yellow-brown solution and in concentrated sulfuric acid to give a red-brown solution.

It dyed leather a yellow-brown.

Its probable formula is as follows:

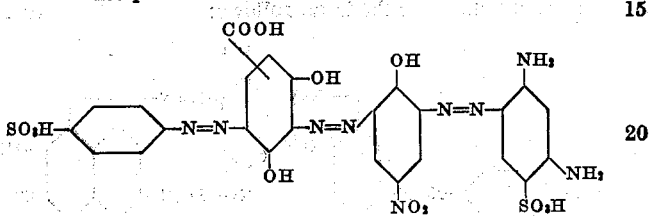

On reducing with sodium hydrosulfite the following compounds are obtained:

P-toluidine-m-sulfonic acid, 2,4-diamino-resorcin, 2,4,6 - triamino - phenol, 2,4,5 - triamino - benzene-sulfonic acid.

Example 9

30.3 parts of amino G salt were substituted for the 17.3 parts of sulfanilic acid in Example 1.

The dry dye was a black powder which dissolved in water to give a dark brown solution and in concentrated sulfuric acid to give a red-brown solution.

It dyed leather a dark chocolate brown.

Its probable formula is as follows:

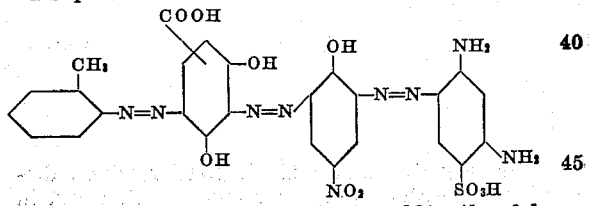

On reducing with sodium hydrosulfite the following compounds are obtained:

Amino G salt, 2,4-diamino-resorcin, 2,4,6-triamino - phenol, 2,4,5-triamino-benzene-sulfonic acid.

Example 10

15.4 parts of resorcylic acid were substituted for the 11 parts resorcin in Example 1.

The dry dye was a black powder which dissolved in water to give a yellow-brown solution and in concentrated sulfuric acid to give a red-brown solution.

It dyed leather a deep chestnut-brown.

Its probable formula is as follows:

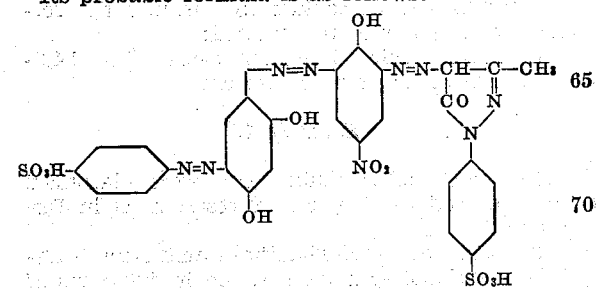

On reducing with sodium hydrosulfite the following compounds are obtained:

Sulfanilic acid, dihydroxy-diamino-benzoic acid, 2,4,6-triamino-phenol, 2,4,5-triamino-benzene sulfonic acid.

Example 11

10.7 parts o-toluidine were substituted for the 17.3 parts of sulfanilic acid in Example 10.

The dry dye was a dark brown powder which dissolved in water to give a yellow-brown solution and in concentrated sulfuric acid to give a dark brown solution.

It dyed leather a yellow-brown.

Its probable formula is as follows:

On reducing with sodium hydrosulfite the following compounds are obtained:

O-toluidine, dihydroxy diamino-benzoic acid, 2,4,6-triamino-phenol, 2,4,5-triamino-benzene-sulfonic acid.

Example 12

30 parts of sulfophenyl-methyl-pyrazolone were substituted for the 20 parts of meta phenylene diamine sulfonic acid in Example 1.

The dry dye was a black powder which dissolved in water to give a yellow-brown solution and in concentrated sulfuric acid to give a dark brown solution.

It dyed leather a dull yellow-brown.

Its probable formula is as follows:

On reducing with sodium hydrosulfite the following compounds are obtained:

Sulfanilic acid, 2,4-diamino-resorcin, 2,4,6-triamino - phenol, amino - sulfophenyl - methyl-pyrazolone.

Example 13

35 parts of R salt dissolved in excess soda ash solution were substituted for the 20 parts of meta phenylene diamine sulfonic acid in Example 1. No sodium acetate was used in the last coupling.

The dry dye was a black powder which dissolved in water to give a yellow-brown solution and in concentrated sulfuric acid to give a red-brown solution.

It dyed leather an olive-brown.

Its probable formula is as follows:

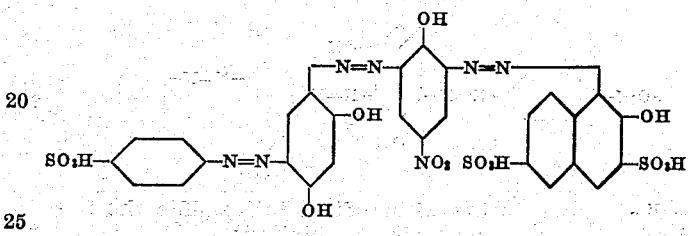

On reducing with sodium hydrosulfite the following products are obtained:

Sulfanilic acid, 2,4-diamino-resorcin, 2,4,6-triamino-phenol, amino R salt.

Example 14

15 parts of resorcin were substituted for the 20 parts of meta phenylene diamine sulfonic acid in Example 1.

The dry dye was a black powder which dissolved in water to give a brown solution and in concentrated sulfuric acid to give a dark brown solution.

It dyed leather a very dark brown.

Its probable formula is as follows:

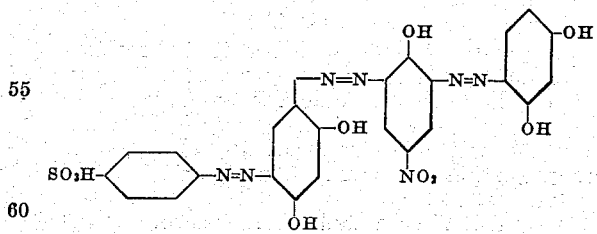

On reducing with sodium hydrosulfite the following compounds are obtained:

Sulfanilic acid, 2,4-diamino-resorcin, 2,4,6-triamino-phenol, amino-resorcin.

Example 15

17.3 parts of sulfanilic acid were diazotized and coupled to 11 parts of resorcin as in Example 1.

28 parts of 1-acetylamino-4-amino-naphthalene-7-sulfonic acid were stirred in 400 parts of water. 9 parts of 100% hydrochloric acid were added and then 6.9 parts of sodium nitrite. Diazotization was continued for 15 minutes at 15-20° C., then a solution of 11 parts of resorcin in 100 parts of water was added. Sodium acetate was added until the solution was no longer acid to Congo red paper. Coupling was completed in 30 minutes. The combination was then made alkaline with sodium hydroxide and heated to 90° C. where it was held for 30 minutes to complete saponification. It was cooled to 20° C. acidified with hydrochloric acid and diazotized with 6.9 parts of sodium nitrite at 20° C. for one hour.

The first combination was made alkaline to brilliant yellow with sodium hydroxide, cooled to 20° C. and the above diazo added. Coupling was very rapid. The dye was isolated by the addition of salt and then hydrochloric acid until neutral to litmus.

The dry dye was a black powder which dissolved in water to give a yellow-brown and in concentrated sulfuric acid to give a dark brown solution.

It dyed leather a good medium brown.

Its probable formula is as follows:

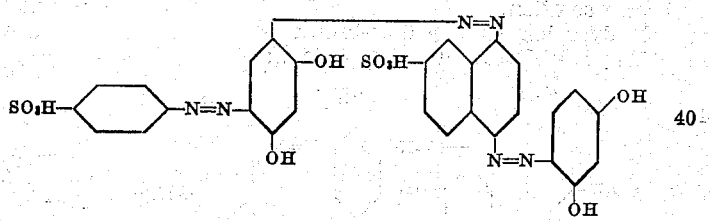

On reducing with sodium hydrosulfite the following compounds are obtained:

Sulfanilic acid, 2,4-diamino-resorcin, amino-resorcin, 1,4 - diamino - naphthalene - 7 - sulfonic acid.

Example 16

13.8 parts of p-nitro-aniline were substituted for the 19.9 parts of picramic acid in Example 1.

The dry dye was a black powder which dissolved in water to give a red-brown solution and in concentrated sulfuric acid to give a blue solution.

It dyed leather a reddish-brown.

Its probable formula is as follows:

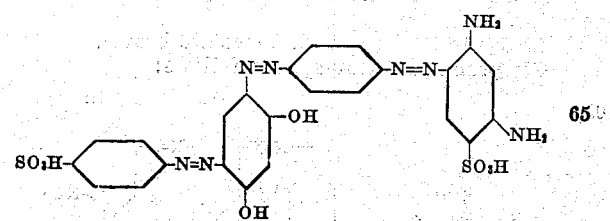

On reducing with sodium hydrosulfite the following compounds are obtained:

Sulfanilic acid, 2,4 diamino-resorcin, P-phenylene-diamine, 2,4,5-triamino-benzene-sulfonic acid.

Example 17

19 parts of 1,3-dihydroxy benzene-4-sulfonic acid were substituted for the 11 parts of resorcin in Example 1.

The dry dye was a black powder which dissolved in water to give a yellow-brown solution and in concentrated sulfuric acid to give a red-brown solution.

It dyed leather a very dark brown.

Its probable formula is as follows:

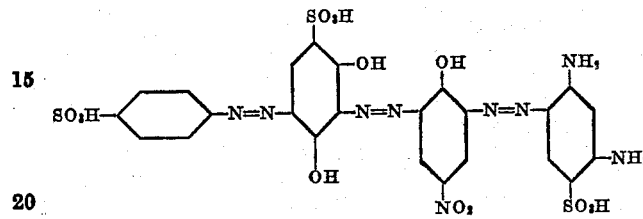

On reducing with sodium hydrosulfite the following compounds are obtained:

Sulfanilic acid, 3,5-diamino-2:4-dihydroxy-benzene-sulfonic acid, 2,4,6-triamino-phenol, 2,4,5-triamino-benzene-sulfonic acid.

Example 18

14.5 parts of 1,3-dihydroxy-4-chlorobenzene were substituted for the 11 parts of resorcin in Example 1.

The dry dye was a black powder which dissolved in water to give a yellow-brown solution and in concentrated sulfuric acid to give a red-brown solution.

It dyed leather a dark brown.

Its probable formula is as follows:

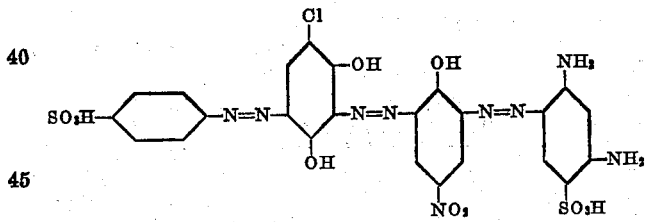

On reducing with sodium hydrosulfite the following compounds are obtained:

Sulfanilic acid, 3,5-diamino-2,4-dihydroxy-1-chlor-benzene, 2,4,6-triamino-phenol, 2,4,5-triamino-benzene sulfonic acid.

Example 19

12.5 parts of orcinol were substituted for the 11 parts of resorcin in Example 1.

The dry dye was a black powder which dissolved in water to give a yellow-brown solution and in concentrated sulfuric acid to give a yellow-brown solution.

It dyed leather a yellow-brown.

Its probable formula is as follows:

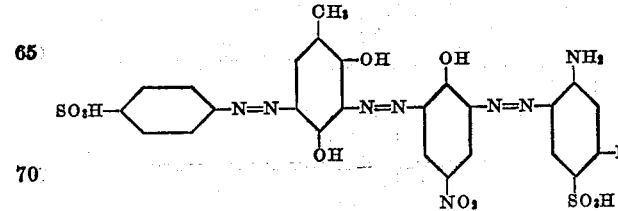

On reducing with sodium hydrosulfite the following products are obtained:

Sulfanilic acid 2,4-dihydroxy-3,5-diamino-toluene, 2,4,6-triamino-phenol, 2,4,5-triamino-benzene-sulfonic acid.

Example 20

11.0 parts of 1,2-dihydroxy-benzene were substituted for the 11 parts of resorcin in Example #1.

The dry dye is a black powder which dissolves in water to give a yellow-brown solution and in concentrated sulfuric acid to give a red-brown solution.

It dyes leather a yellow-brown.

Its probable formula is as follows:

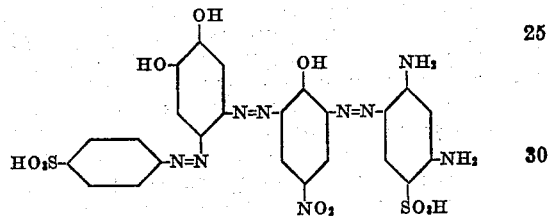

On reduction with sodium hydrosulphite the following compounds are obtained:

Sulfanilic acid, 1,2-dihydroxy-4,5-diaminobenzene, 2,4,6-triamino-phenol, 2,4,5-triamino-benzene-sulfonic acid.

In place of the reactants used in the above examples numerous other compounds may be substituted therefor with satisfactory results. For instance, in place of the compounds used for R, R' and R" other members of the benzene, naphthalene, anthracene, phenyl-naphthyl, di-naphthyl, and carbazole series may be used. These compounds may have substituted thereon groups such as halogen, alkyl, alkoxy, hydroxy, nitro, amide, carboxyl, sulfonic, aryloxy, and aralkyl.

In practicing the process of the present invention, it is advisable to select for the reactants designated as R' nitro-amino or mono-acyl-diamine derivatives of the compounds previously referred to. As is well known to one skilled in the art, this component designated by R' may be diazotized and coupled with the component designated by R″ or it may be coupled with the azo compound previously formed by coupling the component designated by R with the dihydroxy benzene. The resulting compound is treated to convert the nitro or mono-acyl amino group to the amino group, after which it is diazotized and coupled to form the trisazo dye. The methods of treating the nitro group or the mono-acyl-amino group to convert it to an amino group are well known and need not be described herein.

For the compounds previously designated by R″ in addition to the substituents previously mentioned pyrazolones, acyl acet-arylides or other coupling components of the general formula:

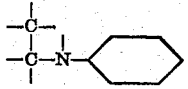

may be used. Among the compounds which may be substituted for R″ with good results are the following:

β-naphthol, α-naphthol, 2-naphthol-6-sulfonic acid, 2-naphthol-8-sulfonic-acid, 2-naphthol-5-sulfonic acid, 2-naphthol-7-sulfonic acid, 2-naphthol-3,7-disulfonic acid, 2-naphthol-4,8-disulfonic acid, 2-naphthol-6,8-disulfonic acid, 2-naphthol-3,6,8-trisulfonic acid, 1-naphthol-2-sulfonic acid, 1-naphthol-4-sulfonic acid, 1-naphthol-5-sulfonic acid, 1-naphthol-3,6,8-trisulfonic acid, α-naphthylamine, β-naphthylamine, 1-amino-5-naphthol-7-sulfonic acid, 1-amino-7-naphthol-3-sulfonic acid, 1-amino-8-naphthol-4-sulfonic acid, 1-amino-8-naphthol-6-sulfonic acid, 2-amino-3-naphthol-6-sulfonic acid, 2-amino-5-naphthol-7-sulfonic acid, 2-amino-7-naphthol-3-sulfonic acid, β-hydroxy-naphthoic acid, J-acid urea, P-amino-benzoyl-J-acid, phenyl-J-acid, salicylic acid, 1,6-Cleve's acid, 1,7-Cleve's acid, naphthionic acid, phenyl-methyl-pyrazolone, chlor-sulfophenyl-methyl-pyrazolone, acetoacetanilide, acetoacet-ortho-chlor-anilide, methyl indole.

In addition to the two hydroxy groups substituted on the benzene nucleus other groups, previously designated by X, may be substituted thereon. Among these substituents are the following: halogen, alkyl, alkoxy, nitro, carboxyl, sulfonic, and hydroxyl. For this component the following compounds give excellent results:

Dihydroxy nitro benzene, dihydroxy anisidines or phenetidines, dihydroxy brom benzenes, dihydroxy fluor benzenes.

Other dihydroxy substituted benzenes to which two equivalents of diazonium salts can be coupled may be used for this component without impairing the utility of the resulting product.

The products of the present invention are especially desirable for dyeing leather, since they eliminate the necessity of using a mixture of dyes where certain colors, particularly the various shades of brown, are required. They dye leather in even shades of excellent stability. In addition to the dyeing of leather they may also be used for various other purposes, such as, the dyeing of wool.

As many apparent and widely different embodiments of this invention may be made without departing from the spirit thereof, it is to be understood that we do not limit ourselves to the foregoing examples or description except as indicated in the following claims.

We claim:

1. A process for producing azo dyes which comprises coupling a diazotized aromatic amine with a dihydroxy benzene, coupling this compound with a member selected from the group consisting of diazotized aromatic nitro-amines and diazotized mono-acyl-diamines of the benzene series, treating the resulting compound to convert the nitro or mono-acyl-amino group to an amino group, then diazotizing and coupling with an aromatic coupling component.

2. A process for producing azo dyes which comprises coupling a diazotized aromatic amine of the benzene series with a dyhydroxy benzene, coupling this compound with a member selected from the group consisting of diazotized aromatic nitroamines and diazotized mono-acyl-diamines of the benezene series, treating the resulting compound to convert the nitro- or mono-acyl-amino group to an amino group, then diazotizing and coupling with an aromatic coupling component of the benzene series.

3. A process for producing azo dyes which comprises coupling a member selected from the group consisting of diazotized amines of the benzene and naphthalene series, with resorcin, coupling this compound with a member selected from the group consisting of diazotized aromatic nitro-amines and diazotized mono-acyl-diamines of the benzene series, treating the resulting compound to convert the nitro- or mono-acyl-amino group to an amino group, then diazotizing and coupling with an aromatic coupling component of the benzene series.

4. A process for producing azo dyes which comprises coupling diazotized sulfanilic acid with resorcin, coupling this compound with diazotized p-nitro-o-amino-phenol treating to convert the nitro group to an amino group, then diazotizing and coupling with meta-phenylene-diamine-sulfonic acid.

5. A process for producing azo dyes which comprises coupling a diazotized technical mixture of 1-amino-naphthalene-6-sulfonic acid and 1-amino-naphthalene-7-sulfonic acid with resorcin, coupling this compound with diazotized picramic acid, treating to convert the nitro group, ortho to the hydroxy group, to an amino group, then diazotizing and coupling with meta-phenylene-diamine-sulfonic acid.

6. A process for producing azo dyes which comprises coupling diazotized sulfanilic acid with resorcin, coupling this compound with diazotized picramic acid, treating to convert the nitro group, ortho to the hydroxy group, to an amino group, then diazotizing and coupling with resorcin.

7. An azo dye having the following general formula:

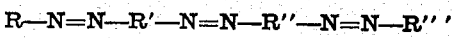

in which R and R‴ represent aromatic nuclei, R′ represents the nucleus of a dihydroxy benzene, and R″ represents the nucleus of an aromatic amine of the benzene series.

8. An azo dye having the following general formula:

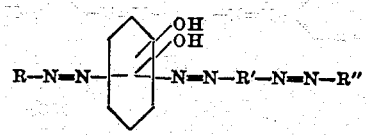

in which R, R′ and R″ represent aromatic nuclei of the benzene series.

9. An azo dye having the following general formula:

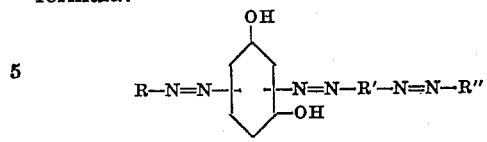

in which R represents an aromatic nucleus of the benzene or naphthalene series, and R' and R'' represent aromatic nuclei of the benzene series.

10. An azo dye having the following formula:

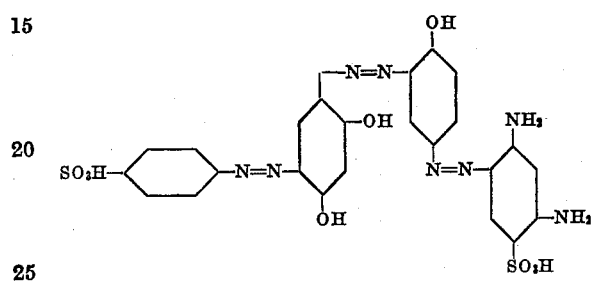

which is a dark brown powder, dissolving in water to give a yellow-brown solution, and in concentrated sulfuric acid to give a dark brown solution.

11. An azo dye having the following formula:

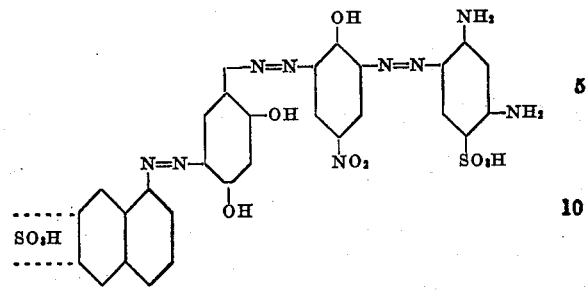

12. An azo dye having the following formula:

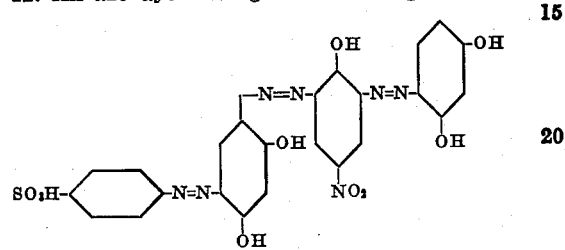

which is a black powder, dissolving in water to give a brown solution and in concentrated sulfuric acid to give a dark brown solution.

FRANCIS HERVEY SMITH.
CRAYTON KNOX BLACK.

CERTIFICATE OF CORRECTION.

Patent No. 2,018,234.                                                                      October 22, 1935.

FRANCIS HERVEY SMITH, ET AL.

It is hereby certified that error appears in the printed specification of the above numbered patent requiring correction as follows: Page 1, first column, line 50, for "nitride" read nitrite; and that the said Letters Patent should be read with this correction therein that the same may conform to the record of the case in the Patent Office.

Signed and sealed this 17th day of December, A. D. 1935.

Leslie Frazer (Seal)                                        Acting Commissioner of Patents.